L. Andrews,
Burrow Trap.
Nº 36,827.
Patented Nov. 4, 1862.
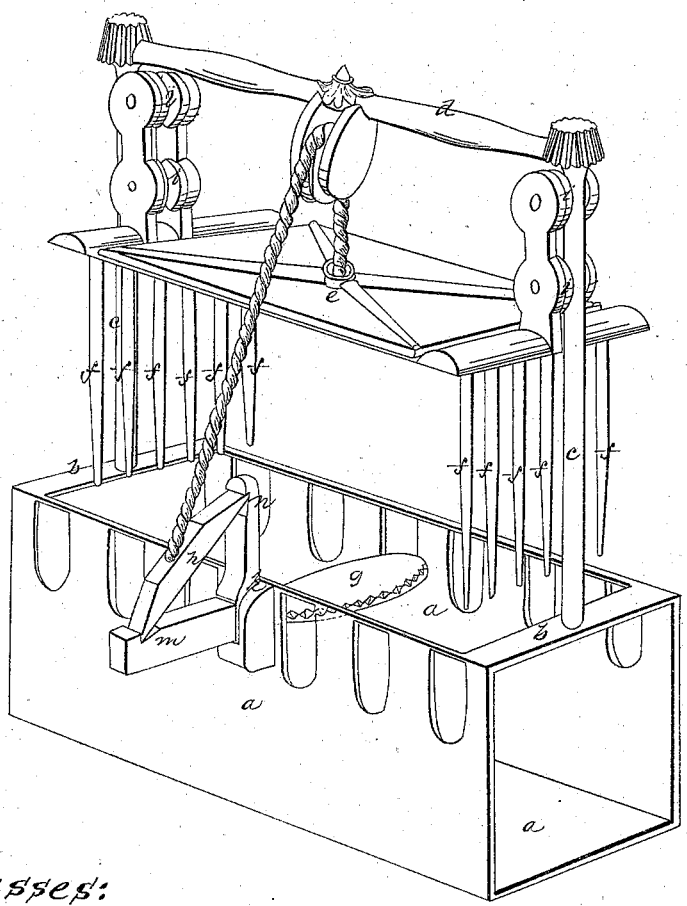
Witnesses:
Chas N Hall
Watts Schwell
Inventor:
L. Andrews.

UNITED STATES PATENT OFFICE.

LAMBERT ANDREWS, OF PLANTSVILLE, CONNECTICUT.

IMPROVEMENT IN MOLE-TRAPS.

Specification forming part of Letters Patent No. 36,827, dated November 4, 1862.

*To all whom it may concern:*

Be it known that I, LAMBERT ANDREWS, of Plantsville, county of Hartford, and State of Connecticut, have invented a certain new and useful Improvement in Mole-Traps; and I do hereby declare that the same is described and represented in the following specification and drawings, and to enable others skilled in the art to make and use the same, I will proceed to describe its construction and operation, referring to the drawings, in which the same letters indicate like parts in each of the figures.

The nature of this improvement in mole or animal traps consists in providing a box made of close or open work, of metal or other proper material, and of any desirable length, breadth, and depth, the two ends and upper sides of which are left open, to allow a drop device, consisting of a plate of a proper size to nearly cover the top of the box, and having pins arranged on the under side and at each end thereof, so that when it drops it will effectually intercept the passage out of the box, said device being held suspended directly over the box by means of any common device used for setting traps, which is operated by the animal attempting to burrow his way through the earth, (filled into the trap,) and thus effectually cutting off his retreat therefrom. The longitudinal open space of this box (when ready for use) is placed in the ground, so as to bring the center line thereof directly in line with the animal's road, and the box filled up lightly with the soil, to remove all suspicion of anything out of the way to the animal until he shall burrow his way to the center of the trap and find himself snugly inclosed therein, the object of which is to elude the suspicion of the animal and to secure him without injury to his skin, the value of which depends upon the quantity and perfecting of their skins when secured for market.

The great trouble hitherto in securing the animal and the injury done to his skin in catching him have heretofore made it comparatively of small value, which are found to be completely overcome by this improvement.

In the accompanying drawings, *a* shows three sides of a box, made solid or of open-work, having a cross-piece, *b*, at each end, which connect the sides of the box, and serve as supports for the posts *c* at their lower ends, which posts are also connected at their upper ends by another cross-pin, *d*.

*e* is a plate nearly the length and width of the top of the box, having friction or guide rollers *i* properly secured thereto, which work against the posts *c*, to guide the plate *e* in its up-and-down movement. At each end and on the under side of the plate *e* are secured pins *f*, or their equivalents, of about the same length of the depth of the box. This plate, with its pins, (when dropped down,) is designed to cut off egress of any animal of any considerable size from the box. The plate, with its appendage, is suspended over the box by means of a cord, *q*, passing over a pulley (secured to the cross-piece *d*) and secured to the latch *h*.

*j* is a trap-lever which passes through and is secured in a stud, *k*, on the side of the box, the outer end of which, with the upper end of the stud *k*, is provided with a catch, *m* and *n*, to receive the ends of the latch *h*.

Now, in using this trap I first cut away the ground where the animal's road is formed, (sufficiently to receive the box,) so as to bring it (the box) directly in line with the road; then fill up the box lightly and carefully with soil, (after the trap is set, as shown and described;) then as the animal passes along his road and comes to the earthy obstruction he again burrows his way along, and in doing so lifts the inner end of the lever *j*, and the plate *e* drops down nearly to the top of the box, and the pins *f* pierce through the soil nearly to the bottom of the box, thus effectually securing the animal inside of the trap.

I am aware that spring and latch traps of various kinds have been in use. Such, therefore, I do not claim; but

What I claim, and desire to secure by Letters Patent, is—

An improved mode of constructing and using mole-traps—viz., the combination of the plate *e*, pins *f*, (arranged at each end of said plate *e*,) and the box *a*, (with proper spring device,) when placed in the ground, as described, and the parts arranged and operating substantially in the manner and for the purpose described.

In testimony whereof I have hereunto set my hand and seal this 27th day of January, 1862.

LAMBERT ANDREWS. [L. S.]

Witnesses:
   CHAS. N. HALL,
   WALTER S. MERRELL.